May 9, 1944.  W. E. POHL  2,348,496
CINEMATOGRAPHIC MASKING
Filed Nov. 26, 1942
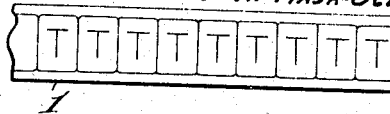
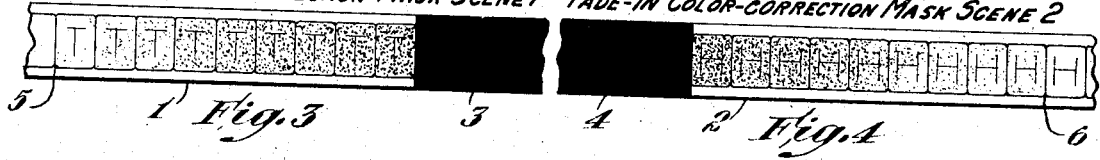
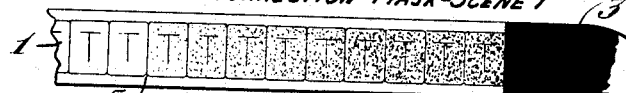
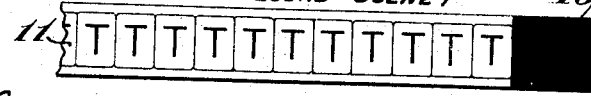
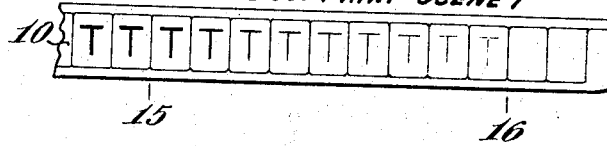
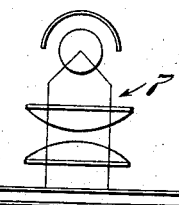
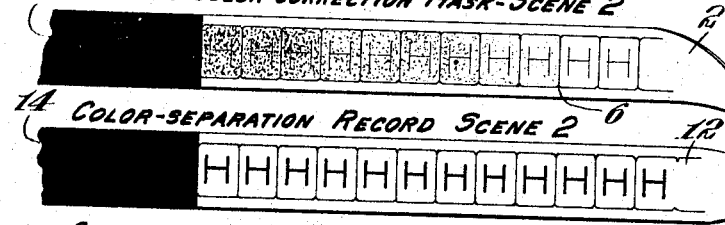
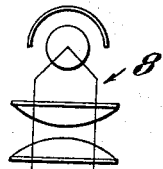
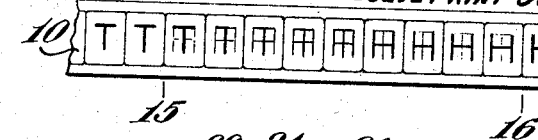
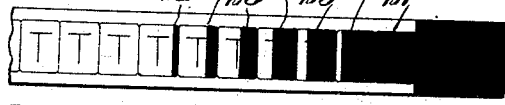
Inventor
Wadsworth E. Pohl
by Roberts, Cushman & Woodbury
Attys.

Patented May 9, 1944

2,348,496

UNITED STATES PATENT OFFICE 2,348,496

CINEMATOGRAPHIC MASKING

Wadsworth E. Pohl, Los Angeles, Calif., assignor to Technicolor Motion Picture Corporation, Hollywood, Calif., a corporation of Maine Application November 26, 1942, Serial No. 467,006

11 Claims. (Cl. 95—2)

In making color motion picture film of the type comprising a plurality of color components, usually yellow, magenta and cyan, it has not been possible to find dyes which have the correct color absorption range. For example there is no suitable dye which absorbs blue without also absorbing considerable green, and none which absorbs green without absorbing some red. However it is possible substantially to offset this improper absorption by modifying the density of the dye throughout one or more of the component records. For example the improper green absorption of the blue-aspect component may be largely corrected by reducing the density of the yellow dye differentially throughout the area of the blue-aspect component in proportion to the density of the green-aspect component throughout the same area. Thus in the parts of the picture which are predominantly green the density of the yellow dye is decreased, thereby to reduce the improper green absorption in such parts, and in parts of the picture where there is no green the density of the yellow dye is not reduced, whereby the blue absorption is unaffected in the latter parts. A convenient way of making the correction consists in forming a weak color-correction record or mask of the green-aspect of the scene and superposing that record over the blue-aspect record in making a corrected blue-aspect print, the two records being of opposite signs (positive and negative) and the density of the corrected print throughout its entire area corresponding to the algebraic sum of densities of the two records at corresponding points.

In like manner the other color-aspect records may be corrected. For example the improper red absorption of the green-aspect magenta component may be largely corrected by reducing the density of the magenta dye differentially throughout the area of the green-aspect component in proportion to the density of the red-aspect component throughout the same area.

When color-separation records representing the blue, green and red aspects of the scene are available the weak color-correction mask or masks may be printed from one or more of them; or the color-correction masks may be formed in the camera, simultaneously with the exposure of the color-separation records, as disclosed in the copending application of Gerald F. Rackett, Sr. No. 465,254, filed November 11, 1942.

Not only is it necessary to correct the color deficiency of the pictures as aforesaid, but also it is often desirable to produce a fade-in at the beginning of a sequence, or a fade-out at the end of a sequence, or a dissolve or a wipe at the junction between successive sequences.

Objects of the present invention are to reduce the steps necessary to secure the aforesaid results, to reduce the number of stage-product films required for the aforesaid purposes, to reduce the time and expense of the production of corrected color motion pictures, and to improve the quality of such pictures.

According to the present invention not only does the procedure involve the formation of the aforesaid color-separation records and the color-correction records but, before the two sets of records are used to print the corrected pictures, the method also involves gradually blocking out the records of successive frames throughout a short length at one end of the sequence of the color-correction records. While this blocking effect can be accomplished in various ways it is preferably effected by gradually increasing or decreasing the density from frame to frame, so that the overall density gradually varies between minimum and maximum limits throughout said length. Then when the corrected pictures are printed with the two sets of records, not only are the color deficiencies of the pictures corrected but there is also produced a gradual change at one end of the sequence, such as a fade, dissolve or wipe. To produce a fade-out the blocking effect is gradually increased from minimum to maximum at the end of a sequence. To produce a fade-in the blocking effect is gradually decreased from maximum to minimum at the beginning of a sequence. To produce a dissolve or wipe at the junction between successive sequences the blocking effect is gradually increased at the end of the first sequence, the blocking effect is gradually decreased at the beginning of the second sequence and then the sequences are printed in overlapped relationship with an overlap approximately equal to the short lengths of variable blocking effects at the ends of the sequences.

A characteristic feature of the invention consists in that the sequence of color-separation records corresponds to one color aspect of the scene and the color-correction records correspond to another color aspect of the scene. For example when printing from blue-aspect color-separation records the color-correction record should correspond to the green aspect of the scene.

While the aforesaid gradual blocking effect may be produced in various ways, it is preferably produced by the application of dye at the ends of the sequences of the color-correction records, the amount of dye applied to successive frames being increased or decreased to produce a fade-out or a fade-in effect. Ordinarily this can best be done by imbibition printing from a relief matrix in which the thickness of the dye absorptive coating, while the same thickness throughout each frame, gradually increases or decreases from frame to frame.

For the purpose of illustration a typical embodiment of the invention is shown in the accompanying drawing in which Figs. 1 and 2 represent two color-correction records or masks of two successive scenes;

Figs. 3 and 4 represent the same films after they have been dyed as aforesaid to produce fade-out and fade-in effects respectively;

Fig. 5 is a diagrammatic view illustrating how the fade-out color-correction mask of the first scene is used in printing the corrected record;

Fig. 6 is a similar view showing how the fade-in color-correction mask is used in printing the two scenes in overlapping relationship; and Fig. 7 illustrates how the invention may be utilized to produce a wipe effect.

The two color-correction masks of Figs. 1 and 2 may be formed in any suitable way, as for example one of the ways above referred to. The two films 1 and 2 are provided with opaque leaders 3 and 4. After the two films have been printed and developed in the usual way they are dyed throughout short lengths of the adjacent ends of the scenes, the density of the dye being graduated from the ends of the scenes to points 5 and 6 at the requisite distance from the ends of the scenes to produce the desired fade-out and fade-in effects. As explained above this dyeing is preferably effected by imbibition printing with matrices which vary in thickness from frame to frame so as to transfer the dye in the graduated amount required for the purpose of gradually blotting out the picture on the film.

After the color-correction masks have been dyed as aforesaid they are used in printing corrected prints as illustrated in Figs. 5 and 6 where contact printers are indicated at 7 and 8, color-separation films at 11 and 12, these films having opaque leaders 13 and 14, and the corrected print at 10. As indicated in Figs. 5 and 6 the color-correction masks and the corresponding color-separation records are superposed in printing the corrected pictures, the films feeding to the left in both figures. The film 10 may feed continuously from one printer to the other or it may be wound as it leaves the first printer and then rewound before being fed to the other printer. If the color-separation records are negatives of the blue aspect of the scenes, the color-correction masks are weak positives of the green aspect of the scenes, and if the color-separation films are negatives of the green aspect of the scene the color-correction masks are weak positives of the red aspect of the scenes. In the two printing operations the opaque leaders prevent the film 10 from being exposed beyond the ends of the scenes.

As indicated by the double printing of the film 10 in Fig. 6, between the lines 15 and 16, the adjacent ends of the scenes are printed in overlapping relationship, line 15 of film 10 corresponding to lines 5 of films 1 and 11 and line 16 of film 10 corresponding to lines 6 of films 2 and 12. Owing to the gradual increase of the density of the dye in film 1 at the end of the scene, the density of the pictures printed on film 10 gradually decreases from the line 15 to the end of the scene, at line 16, and due to the gradual increase in the density of the dye at the beginning of the scene recorded on film 2 the density of the pictures of scene 2 gradually increases from the line 15 to line 16. Thus the pictures up to line 15 of the films represent the first scene only and all the pictures beyond line 16 represent only the second scene. Between the lines 15 and 16 pictures of the first scene gradually fade out and the pictures of the second scene gradually fade in, thus producing the dissolve effect.

Instead of a dissolve effect a wipe effect may be produced by using masks, such as shown in Fig. 7, in which the dye is applied to the films at the ends of the scenes, not in gradually changing density but in gradually changing areas throughout successive frames. Thus in Fig. 7, where the films recording successive scenes are designated 18 and 19 respectively, the dyed areas 21, 22, 23, 24 and 25 of successive frames are all of sufficient density completely to block out the corresponding portions of the pictures, but from frame to frame they occupy more or less of the area of the frame. The dyed areas of the first scene correspond to the undyed areas of the second scene and vice versa.

It should be understood that the present disclosure is for the purpose of illustration only and that this invention includes all modifications and equivalents which fall within the scope of the appended claims.

I claim:

1. The method of producing color motion pictures which comprises forming a sequence of color-separation records, forming a concomitant sequence of color-correction records, gradually blocking out the records of successive frames throughout a short length at one end of the sequence of color-correction records, and with both of said records printing a sequence of corrected pictures, the color-correction records serving the two-fold purpose of correcting color deficiencies of the pictures and also producing a gradual change at one end of the sequence of corrected pictures.

2. The method of producing color motion pictures which comprises forming a sequence of color-separation records corresponding to one color aspect of a scene, forming a concomitant sequence of color-correction records corresponding to another color aspect of the scene, gradually blocking out the records of successive frames throughout a short length at one end of the sequence of color-correcton records, and with both of said records printing a sequence of corrected pictures, the color-correction records serving the two-fold purpose of correcting color deficiencies of the pictures and also producing a gradual change at one end of the sequence of corrected pictures.

3. The method of producing color motion pictures which comprises forming a sequence of color-separation records corresponding to the blue aspect of a scene, forming a concomitant sequence of color-correction records corresponding to the green aspect of the scene, increasing the overall density of the record frames throughout a short length at one end of the sequence of color-correction records so that the overall density gradually varies between minimum and maximum limits throughout said length, and with both of said records printing a sequence of corrected pictures, the color-correction records serving the two-fold purpose of correcting color deficiencies of the pictures and also producing a gradual change at one end of the sequence of corrected pictures.

4. The method of producing color motion pictures which comprises forming successive sequences of color-separation records, forming concomitant sequences of color-correction records, increasing the overall density of the record frames throughout a short length at the end of each sequence of color-correction records so that the overall density gradually increases from minimum to maximum throughout each such length, decreasing the overall density of the record frames throughout a short length at the beginning of each sequence of color-correction records so that the overall density gradually decreases from maximum to minimum through each such length, and with both of said records printing a sequence of corrected pictures, the sequences being printed in overlapped relationship with an overlap approximately equal to said short length, the color-correction records serving the two-fold purpose of correcting color deficiencies of the pictures and also producing a dissolve at the junctions between sequences.

5. The method of producing color motion pictures which comprises forming successive sequences of color-separation records corresponding to one color aspect of a scene, forming a concomitant sequence of color-correction records corresponding to another color aspect of the scene, increasing the overall density of the record frames throughout a short length at one end of the sequence of color-correction records so that the overall density gradually varies between minimum and maximum limits throughout said length, decreasing the overall density of the record frames throughout a short length at the beginning of each sequence of color-correction records so that the overall density gradually decreases from maximum to minimum through each such length, and with both of said records printing a sequence of corrected pictures, the sequences being printed in overlapped relationship with an overlap approximately equal to said short length, the color-correction records serving the two-fold purpose of correcting color deficiencies of the pictures and also producing a dissolve at the junctions between sequences.

6. The method of producing color motion pictures which comprises forming successive sequences of color-separation records corresponding to the blue aspect of a scene, forming a concomitant sequence of color-correction records corresponding to the green aspect of the scene, increasing the overall density of the record frames throughout a short length at one end of the sequence of color-correction records so that the overall density gradually varies between minimum and maximum limits throughout said length, decreasing the overall density of the record frames throughout a short length at the beginning of each sequence of color-correction records so that the overall density gradually decreases from maximum to minimum through each such length, and with both of said records printing a sequence of corrected pictures, the sequences being printed in overlapped relationship with an overlap approximately equal to said short length, the color-correction records serving the two-fold purpose of correcting color deficiencies of the pictures and also producing a dissolve at the junctions between sequences.

7. The method of producing color motion pictures which comprises forming a sequence of color-separation records, forming a concomitant sequence of color-correction records, by graduated dyeing gradually blocking out the records of successive frames throughout a short length at one end of the sequence of color-correction records, and with both of said records printing a sequence of corrected pictures, the color-correction records serving the two-fold purpose of correcting color deficiencies of the pictures and also producing a gradual change at one end of the sequence of corrected pictures.

8. The method of producing color motion pictures which comprises forming a sequence of color-separation records corresponding to one color aspect of a scene, forming a concomitant sequence of color-correction records corresponding to another color aspect of the scene, by graduated dyeing gradually blocking out the records of successive frames throughout a short length at one end of the sequence of color-correction records, and with both of said records printing a sequence of corrected pictures, the color-correction records serving the two-fold purpose of correcting color deficiencies of the pictures and also producing a gradual change at one end of the sequence of corrected pictures.

9. The method of producing color motion pictures which comprises forming successive sequences of color-separation records, forming concomitant sequences of color-correction records, by graduated dyeing increasing the overall density of the record frames throughout a short length at the end of each sequence of color-correction records so that the overall density gradually increases from minimum to maximum throughout each such length, decreasing the overall density of the record frames throughout a short length at the beginning of each sequence of color-correction records so that the overall density gradually decreases from maximum to minimum through each such length, and with both of said records printing a sequence of corrected pictures, the sequences being printed in overlapped relationship with an overlap approximately equal to said short length, the color-correction records serving the two-fold purpose of correcting color deficiencies of the pictures and also producing a dissolve at the junctions between sequences.

10. The method of producing color motion pictures which comprises forming a sequence of color-separation records, forming a concomitant sequence of color-correction records, by imbibition printing increasing the overall density of the record frames throughout a short length at one end of the sequence of color-correction records so that the overall density gradually varies between minimum and maximum limits throughout said length, and with both of said records printing a sequence of corrected pictures, the color-correction records serving the two-fold purpose of correcting color deficiencies of the pictures and also producing a gradual change at one end of the sequence of corrected pictures.

11. The method of producing color motion pictures which comprises forming successive sequences of color-separation records, forming concomitant sequences of color-correction records, by imbibition printing increasing the overall density of the record frames throughout a short length at the end of each sequence of color-correction records so that the overall density gradually increases from minimum to maximum throughout each such length, decreasing the overall density of the record frames throughout a short length at the beginning of each sequence of color-correction records so that the overall density gradually decreases from maximum to minimum through each such length, and with both of said records printing a sequence of corrected pictures; the sequences being printed in overlapped relationship with an overlap approximately equal to said short length, the color-correction records serving the two-fold purpose of correcting color deficiencies of the pictures and also producing a dissolve at the junctions between sequences.

WADSWORTH E. POHL.